J. S. COLDWELL.
MOTOR CONTROLLED BRAKE.
APPLICATION FILED MAR. 19, 1917.

1,261,771.

Patented Apr. 9, 1918.

Inventor
John S. Coldwell
By Howlett Hubbard
Attorney

UNITED STATES PATENT OFFICE.

JOHN S. COLDWELL, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLED BRAKE.

1,261,771.  Specification of Letters Patent.  Patented Apr. 9, 1918.

Application filed March 19, 1917. Serial No. 155,794.

*To all whom it may concern:*

Be it known that I, JOHN S. COLDWELL, a citizen of the United States, residing at Milwaukee, in the county of Milwaukee and State of Wisconsin, have invented new and useful Improvements in Motor - Controlled Brakes, of which the following is a full, clear, concise, and exact description, reference being had to the accompanying drawing, forming a part of this specification.

This invention relates to motor controlled brakes and the like and is particularly applicable to brakes which are mechanically set and motor released.

Such brakes are commonly provided with torque motors for releasing the same, the resistance of the brake setting spring or springs being relied upon to stall the motor upon full release of the brake. In many instances, however, it has been found that the resistance of the brake setting spring or springs is inadequate for this purpose and it has also been found that upon resetting of the brake, with a consequent mechanical drive of the motor, the inertia of the motor armature causes a variable braking effect which is very undesirable.

An object of the present invention is to provide reliable and efficient limit means for the motor of such a brake or similar device, by which the arrest of the motor may be accurately timed and effected gradually.

Another object is to provide limit means of the character set forth which will permit unrestrained initial operation of the motor in both directions.

Other objects and advantages of the invention will hereinafter appear.

One embodiment of the invention, namely a motor controlled brake, is illustrated in the accompanying drawing, and the same will now be described, it being understood that the same is susceptible of various modifications falling within the scope of the appended claims.

Figure 1:
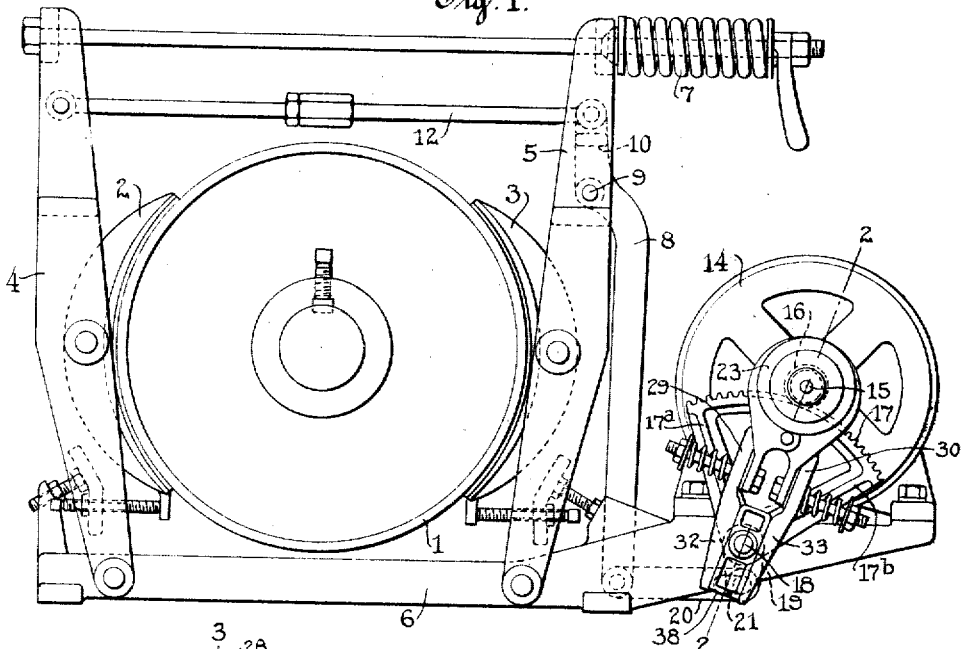
Figure 1 is a side elevation of the brake.

Referring to Fig. 1, the brake selected for illustration comprises a drum 1 to be fixed to the shaft to be braked, brake shoes 2 and 3 carried by arms 4 and 5 respectively, said arms being pivotally mounted upon a base 6 and connected at their free ends by a spring tension device 7, said tension device acting on said arms to set the brake shoes against said drum. The releasing mechanism comprises a lever 8 pivoted at 9 to the arm 5, said lever having an extension 10 connected by a link 12 to the arm 4. This lever and link form a toggle which serves to spread the arms and thereby release the brake shoes, upon counter-clockwise movement of the lever. The lever is operable to so release the brake shoes by a torque motor 14 having on its armature shaft 15 a pinion 16 meshing with a gear sector 17 pivotally connected at 18 upon the base 6 and having a lever extension 19 connected to the lever 8 through a link 20. The link 20 is slotted at 21 to provide a lost motion connection between said link and the gear sector for a purpose hereinafter set forth.

The arrangement is such that clockwise rotation of the motor armature rotates the gear sector counter-clockwise to exert through its lever extension 19 a pull upon the lever 8 whereas during brake setting operation the lever 8 drives the gear sector clockwise thereby driving the motor armature counter-clockwise. The mechanical drive of the motor armature during brake setting operation is very desirable in that it insures against setting of the brake too rapidly.

Figure 2:
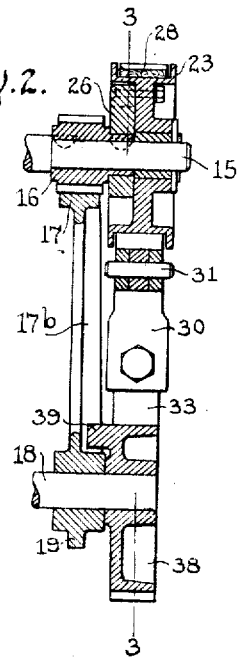
Fig. 2 is an enlarged sectional view taken substantially on line 2—2 of Fig. 1; and, Fig. 3 is a sectional view taken on line 3—3 of Fig. 2.

Considering now the limit means for the motor armature, the same includes a brake wheel 23 loosely mounted on the armature shaft and provided internally with spaced stops 24 and 25 arranged on opposite sides of dog 26 fixed to the armature shaft. This connection of the wheel and armature shaft provides for drive of the former by the latter in opposite directions but subject to a limited rotary play of the latter relative to the former upon reversals of rotation of said shaft, such play being equal to the play of the dog between the stops which, as shown, is approximately 180°. The wheel is provided with brake shoes 27 and 28 carried by levers 29 and 30 respectively which are pivotally connected at 31 and suspended from said wheel. The levers 29 and 30 are respectively provided with extensions 32 and 33 having pivotal bearings thereon at 34 and 35 respectively and being connected to said levers by spring tension devices 36 and 37 respectively. The arrangement is such that spreading of the extensions biases the levers through the spring tension devices to set the brake shoes against the brake wheel and a cam 38 is provided to so spread said extensions. The cam which is of oblong shape is interposed between the extensions and rotatable mounted upon the pivot stud 18 of the gear sector. Further, the cam is provided with a rearwardly extending lug 39 (Fig. 2) projecting between ribs 17ª and 17ᵇ provided on the gear sector, as shown in Fig. 1. Thus the cam is rendered dependent for rotation upon operation of the gear sector and it is to be understood that the ribs on the sector are so spaced as to provide a lost motion between said cam and said sector substantially equal to the degree of movement of the latter incident to setting and release of the main brake shoes 2 and 3. In other words, the arrangement is such that the cam 38 is only rotated as the sector runs into its limits for release and setting of the main brake.

Figure 3:
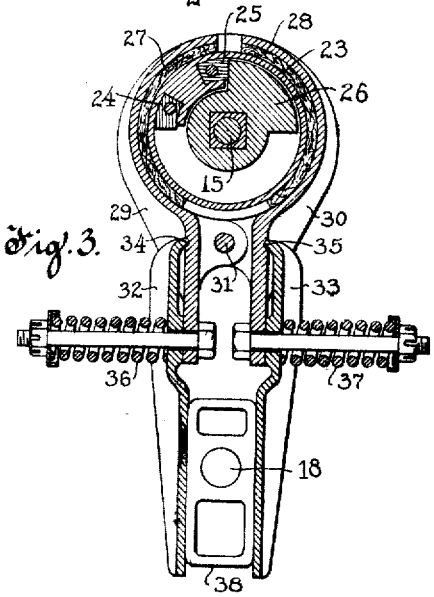

Thus assuming positioning of the sector between limits, the cam 38 would assume the position shown in Fig. 3, thereby relieving the motor armature of the braking action of shoes 27 and 28. Under such conditions the motor would be free to drive or to be mechanically driven as above described.

Then assuming drive of the sector by the motor, the latter would rotate the dog 26 to engage stop 24 and thereupon rotate the wheel 23, which under the assumed conditions would be relieved of the braking action of shoes 27 and 28. Accordingly the motor would operate without retardation except for the slight drag of its brake mechanism to drive the gear sector into its brake release limit. Thereupon the rib 17ᵇ of said gear sector would engage the lug 39 on the cam 38 and rock said cam to set the brake shoes 27 and 28 thereby gradually stalling the motor. The motor, however, would then be free to rotate in a reverse direction to a degree equal to the play between the dog 26 and stop 25, thereby providing for initial resetting operation of the main brake without restraint by the motor brake. Moreover, the resetting operation would cause the gear sector to release the cam 38 thereby relieving the motor shaft of the braking action of shoes 27 and 28 and as shown the arrangement is such as to effect this operation during the rotation of the armature shaft to bring the dog 26 into engagement with stop 25. Then assuming continued resetting operation, the gear sector would upon running into its brake setting limit rock the cam 38 in a reverse direction through the medium of its rib 17ª and thereby again set the brake shoes 27 and 28 to gradually arrest the motor. In this connection it is to be noted that the lost motion connection between the lever and gear sector would permit a slight over-travel of the latter after full setting of the main brake and with the arrangement shown this over-travel of the sector is utilized for setting of the brake shoes 27 and 28. In other words, the setting of the brake shoes would be delayed until over-travel of the sector, thereby insuring full setting operation of the main brake prior to arrest of the motor.

After arrest of the motor as last described, the same would be free to rotate in a reverse direction free from restraint by brake shoes 27 and 28, i. e., in brake releasing direction through a range equal to the play between dog 26 and stop 24. Upon such rotation the motor would drive the gear sector to release brake shoes 27 and 28 thereby restoring the parts to the relation first assumed.

What I claim as new and desire to secure by Letters Patent is:

1. In combination, a braking device to be operated, a torque motor for operating the same and braking means for said motor operable automatically upon a given operation of said device to restrain further operation of said motor in the same direction while permitting reverse operation of said motor free from restraint thereby.

2. In combination, a braking device biased in one direction, a torque motor to operate said device in a reverse direction and to be driven thereby according to its torque value and means for gradually braking and arresting said motor upon predetermined reverse operations of said device.

3. In combination, a braking device biased in one direction, a torque motor to operate said device in a reverse direction and to be operated thereby according to its torque value and means for gradually arresting said motor upon predetermined reverse movements of said device, said means permitting reverse operation of said motor free from restraint thereby upon arresting its operation in either direction.

4. In combination, a device biased in one direction, a torque motor connected to said device to operate the same and to be driven thereby according to its torque value and a braking device for said motor operable automatically to limit its operation in both directions and to exert a graduated braking force thereon.

5. In combination, a device biased in one direction, a torque motor connected thereto to operate the same and to be driven thereby according to its torque value and a braking device for said motor operable automatically to limit its operation in both directions, said braking device permitting initial operation of said motor in reverse directions free from restraint thereby.

6. In combination, a braking device to be operated, a torque motor, an operative connection therebetween and a brake for said motor mechanically operable by one of said elements, said brake when set to arrest the operation of said motor in one direction, permitting operation thereof in a reverse direction free from restraint thereby.

7. In combination, a device having reverse movements and being biased for movement in one direction, a torque motor, a driving connection between said device and said motor and a brake for said motor mechanically operable by one of said elements upon predetermined reverse movements of said device, said brake when set to arrest operation of said motor in either direction, permitting reverse operation of said motor free from restraint thereby.

8. In combination, a device to be operated, a motor for operating the same, an automatically operated brake for said motor to limit the operation of said device, said motor having a play relative to a member of said brake whereby said motor when arrested may rotate in a reverse direction free from restraint by said brake.

9. In combination, a device operable in opposite directions, a motor operatively connected thereto, and a brake for said motor to limit its rotation in opposite directions, said motor having a lost motion connection with a member of said brake whereby when arrested upon operation in either direction, said motor may rotate in a reverse direction free from restraint by said brake.

10. In combination, a device to be operated, a motor for operating the same, an automatically operable brake for said motor to limit the operation of said device, said motor having a play relative to a member of said brake whereby said motor when arrested may rotate in a reverse direction free from restraint by said brake, said brake being releasable by such reverse rotation of said motor.

11. In combination, a device operable in opposite directions, a motor operatively connected thereto, and a brake for said motor to limit its rotation in opposite directions said motor having a lost motion connection with a member of said brake whereby when arrested upon operation in either direction said motor may rotate in a reverse direction free from restraint by said brake, said brake being releasable by such reverse rotation of said motor.

12. In combination, a brake biased to set, a motor, an operative connection between said brake and said motor for release of the former by the latter and for drive of the latter by the former in resetting, said connection permitting a limited degree of operation of said motor independently of said brake after resetting thereof and means operable automatically to thereupon brake said motor.

13. In combination, a brake biased for setting thereof, a torque motor to release said brake and to be driven thereby upon resetting thereof and means supplementing the resistive force of said brake to stall said motor upon release of said brake and to arrest said motor upon resetting of said brake.

14. In combination, a brake biased for setting thereof, a torque motor to release said brake and to be driven thereby upon resetting thereof and means supplementing the resistive force of said brake to stall said motor upon release of said brake and to arrest said motor upon resetting of said brake, means permitting reverse operation of said motor free from restraint thereby after arresting its operation in either direction.

In witness whereof, I have hereunto subscribed my name.

JOHN S. COLDWELL.